Jan. 14, 1936.         A. O. COBBS              2,027,517
                    CERTIFICATE HOLDER
                    Filed Nov. 26, 1934

INVENTOR.
A. O. Cobbs
BY
M. Talbert Dick
ATTORNEY.

Patented Jan. 14, 1936

2,027,517

UNITED STATES PATENT OFFICE 2,027,517

CERTIFICATE HOLDER

Ansalem Orville Cobbs, Des Moines, Iowa

Application November 26, 1934, Serial No. 754,748

2 Claims. (Cl. 40—10)

This invention relates generally to identification or certificate holders, and more particularly to flexible holders that are designed to be wrapped around the steering wheel column of an automotive vehicle such as an automobile, bus, truck, or like.

The principal object, therefore, of my invention is to provide a certificate or like holder that is successful in the service for which it is intended, economical in manufacture, and durable in use.

A further object of this invention is to provide a certificate holder of novel construction and one that is easily and readily removed from or placed on the steering wheel column without tools and without danger of damaging or marring the seating compartment of the vehicle in which it is used.

A still further object of my invention is to provide a certificate holder that when in a detached condition has both ends open for the insertion or removal of the instrument to be displayed.

A still further object of this invention is to provide a certificate holder that is automatically held in a closed condition when installed around a steering wheel column post.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 2:
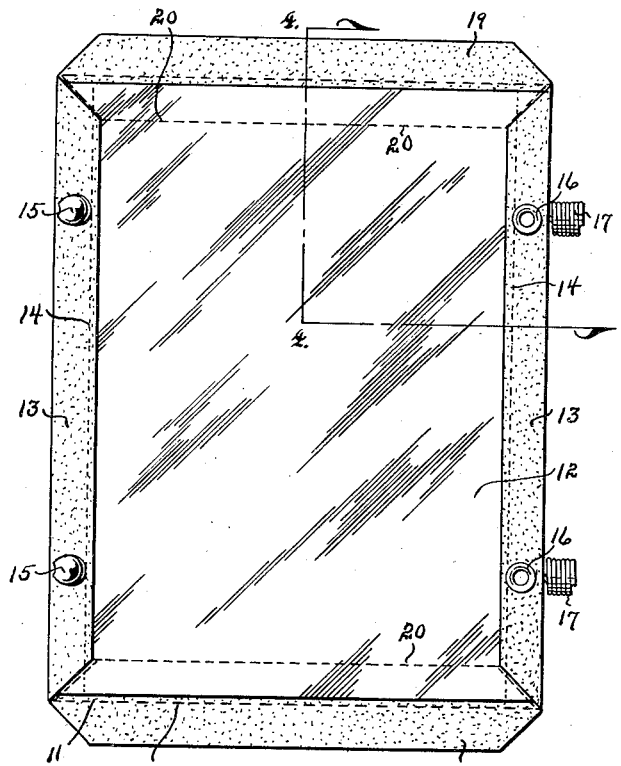
Fig. 2 is a top plan view of the body portion of my device and more fully illustrates its construction.

Referring to the drawing in detail, I have used the numeral 10 to designate a steering wheel post. The numeral 11 designates the base portion of my holder which is rectangular in construction with the corners cut off. This base portion may be of any suitable material such as leather, leatherette, or like. The numeral 12 designates a sheet of transparent material such as celluloid or like. This sheet 12 is also of rectangular construction, but has a width and length both less than the width and length of the base 11, as shown in Fig. 2.

In the manufacture of my holder the side marginal edge portions 13 of the base 11 are folded over and upon the side marginal edge portions of the transparent sheet 12. These flap portions 13 and transparent sheet 12 are permanently held in position as shown in Fig. 2, by any suitable means such as stitching 14.

Figure 1:
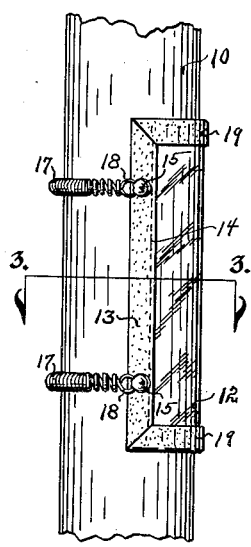
Fig. 1 is a side view of a steering wheel post with my certificate holder installed thereon.
Figure 3:
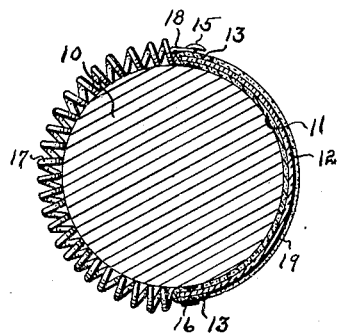
Fig. 3 is a cross-sectional view of my holder and is taken on line 3—3 of Fig. 1.

If a means for securing the holder around a steering wheel column similar to that shown in the drawing is used, the stitching 14 may, if desired, be dispensed with. The reason for this is that the securing means employs rivets which rigidly secure the flaps 13, base 11, and transparent sheet 12 together, as shown in the drawing. I will now describe the securing means as shown in the drawing. The numeral 15 designates two spaced apart hook rivets extending through one of the flaps 13, transparent sheet 12, and base portion 11. The hook portion of each of the rivets 15 extends inwardly as shown in Fig. 3. Directly opposite from the hook rivets 15 and extending through the other flap 13, transparent sheet 12, and base portion 11 are the two spaced apart rivets 16. These rivets 16 each have secured to them a coil spring 17. On the free end of each of these springs 17 is a ring 18 capable of being engaged by the hook portion of one of the rivets 15. As the transparent sheet 12 has a length less than the length of the base portion 11, a flap 19 will be available at each end of the compartment portion of the device. This particular construction is very important, as when the holder is removed from a steering wheel post and in a flat condition as in Fig. 2, a certificate or like can be inserted from either end between the base portion and transparent sheet. It is just as easy to remove a certificate from either end. This is not the case, however, when the holder is wrapped around a cylindrical object such as a steering wheel post and the flaps 19 have been folded over and upon the marginal end portions of the transparent sheet 12, as shown in Fig. 1. The reason for this is that flaps 19 rest in an arc of greater diameter than the diameter of the arc in which the base 11 resides. This action tightens the flaps 19 and makes them so taut around the steering wheel post that, although not fastened to the transparent sheet, it is almost impossible to bend them back to an unfolded open condition, as shown in Fig. 2.

In view of this, no fastening means is necessary to hold the flaps in closed positions when the device is wrapped around a steering wheel post.

Dotted lines 20 in Fig. 2, show the positions of the flaps 19 when in a folded closed arrangement. By cutting off the corners of the original base portion, the flaps 13 and 19 will be mitered and will conform with each other, as shown in Fig. 1.

Figure 4:
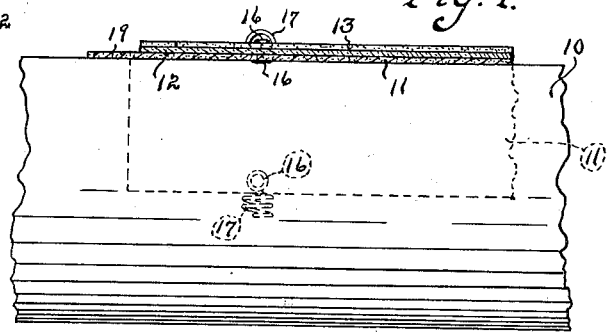
Fig. 4 is a sectional view of the holder taken on line 4—4 of Fig. 2, with dotted lines showing the position of this part of the holder when flexed around the steering wheel post.

To place the holder around a steering wheel post or like, it is merely necessary to lay the holder on the post such as shown in Fig. 4, fold the flaps 19 over the end portions of the transparent sheet 12, then flex the holder around the post, bring the springs 17 on around the post and hook them over the hook portions of the rivets 15. To remove the holder it is merely necessary to unhook the spring rings 18 from the rivets 15. The springs 17 will yieldingly hold the certificate holding portion of my device in proper place on the post. As the sheet 12 is transparent any certificate or like placed in the holder by being inserted between the base 11 and sheet 12 will be readily visible.

Some changes may be made in the construction and arrangement of my improved certificate holder without departing from the real spirit and purpose of my invention, and it is my intention to cover by my claims any modified forms of structure or use of mechanical equivalents which may be reasonably included within their scope.

I claim:

1. In a device of the class described, a single elongated rectangular sheet of flexible material having its four corners trimmed and its two side marginal edge portions folded over to form a side flap at each of its sides, a sheet of transparent flexible material over the main portion of said first-mentioned sheet and extending under each of said flap portions; said transparent sheet member having a length less than the length of said first-mentioned sheet member to provide end flaps on said first-mentioned sheet member capable of being folded over the end portions of said transparent sheet, a means for securing said first-mentioned sheet, said side flaps, and said sheet of transparent material together leaving said end flaps on said first-mentioned sheet free and unsecured, and a resilient element designed to have one of its ends operatively secured to one side edge portion of said first-mentioned sheet member and its other end operatively secured to the other side edge portion of said first-mentioned sheet member.

2. In a device of the class described, a single elongated rectangular sheet of flexible material having its two side marginal edge portions folded over to form a side flap at each of its sides, a sheet of transparent flexible material over the main portion of said first-mentioned sheet and extending under each of said flap portions; said transparent sheet member having a length less than the length of said first-mentioned sheet member to provide end flaps on said first-mentioned sheet member capable of being folded over the end portions of said transparent sheet, a means for securing said first-mentioned sheet, said side flaps, and said sheet of transparent material together leaving one of said end flaps on said first-mentioned sheet free and unsecured, and a resilient element designed to have one of its ends operatively secured to one side edge portion of said first-mentioned sheet member and its other end operatively secured to the other side edge portion of said first-mentioned sheet member.

ANSALEM ORVILLE COBBS.